(12) United States Patent
Del Bino et al.

(10) Patent No.: US 10,503,048 B2
(45) Date of Patent: Dec. 10, 2019

(54) NONRECIPROCAL LIGHT PROPAGATION SYSTEMS AND METHODS

(71) Applicant: NPL Management Limited, Teddington, Middlesex (GB)

(72) Inventors: Leonardo Del Bino, Kingston upon Thames (GB); Sarah Louise Stebbings, Teddington (GB); Pascal Patrice Del'Haye, Teddington (GB); Jonathan Michael Silver, Hampton (GB)

(73) Assignee: NPL Management Limited, Teddington (GB)

( * ) Notice: Subject to any disclaimer, the term of this patent is extended or adjusted under 35 U.S.C. 154(b) by 0 days.

(21) Appl. No.: 16/312,454

(22) PCT Filed: Jun. 23, 2017

(86) PCT No.: PCT/GB2017/051848
§ 371 (c)(1),
(2) Date: Dec. 21, 2018

(87) PCT Pub. No.: WO2017/221028
PCT Pub. Date: Dec. 28, 2017

(65) Prior Publication Data
US 2019/0129276 A1     May 2, 2019

(30) Foreign Application Priority Data

Jun. 24, 2016 (GB) .................................. 1611046.2

(51) Int. Cl.
*G02F 1/35* (2006.01)
*G02F 1/355* (2006.01)

(52) U.S. Cl.
CPC ............ *G02F 1/3511* (2013.01); *G02F 1/355* (2013.01); *G02F 1/3515* (2013.01); *G02F 1/3517* (2013.01); *G02F 2203/15* (2013.01)

(58) Field of Classification Search
CPC ... G02F 1/3511; G02F 1/3515; G02F 2203/15
See application file for complete search history.

(56) References Cited

U.S. PATENT DOCUMENTS

| | | | | |
|---|---|---|---|---|
| 4,533,249 A | * | 8/1985 | Webber | G01C 19/727 356/461 |
| 5,537,671 A | * | 7/1996 | Toyama | G01C 19/72 356/461 |

(Continued)

OTHER PUBLICATIONS

Kaplan et al., "Enhancement of the Sagnac Effect due to Nonlinearly Induced Nonreciprocity," Optics Ltrs, vol. 6, No. 12, pp. 590-592 (Dec. 1, 1981).
Kaplan et al., "Directionally Asymmetrical Bistability in a Symmetrically Pumped Nonlinear Ring Interferometer," Optics Comms., vol. 40, No. 3, pp. 229-232 (Jan. 1, 1982).

(Continued)

*Primary Examiner* — Daniel Petkovsek (57) ABSTRACT

An optical resonator system comprises an optical resonator (30) and means (32, 42, 44) for coupling into the resonator counterpropagating waves at total intensities such as to produce a non-linear interaction between the first and second waves whereby to break the symmetry to establish different resonant frequencies between the first and second counterpropagating waves whereby to produce different optical effects in the opposite directions. A common light source, e.g. a laser 32, is employed with an amplifier 40 and a modulator 50, or different light sources can be employed.

15 Claims, 5 Drawing Sheets

(56) References Cited

U.S. PATENT DOCUMENTS

| | | | | |
|---|---|---|---|---|
| 6,643,023 B2* | 11/2003 | Honda | ................. | G01C 19/727 356/461 |
| 7,903,255 B2* | 3/2011 | Kaplan | ................. | G01C 19/72 356/460 |
| 9,128,246 B2* | 9/2015 | Hafezi | ..................... | G02B 6/26 |
| 9,772,189 B2* | 9/2017 | Strandjord | ........... | G01C 19/727 |
| 2003/0123780 A1 | 7/2003 | Fischer | | |
| 2009/0027754 A1* | 1/2009 | Steinberg | ............... | B82Y 20/00 359/238 |
| 2010/0002283 A1* | 1/2010 | Sanders | .............. | G01C 19/727 359/279 |
| 2015/0116802 A1* | 4/2015 | Agrawal | .............. | G02F 1/3511 359/107 |

OTHER PUBLICATIONS

Wang et al., "A Nonlinear Microresonator Refractive Index Sensor," J. of Lightwave Tech., vol. 33, No. 10, pp. 4360-4366 (Oct. 15, 2015).
Written Opinion of the Internatoinal Searching Authority for PCT/GB2017/051848.
International Search Report and Written Opinion with respect to PCT/GB2017/051848 (dated Oct. 13, 2017).
Kaplan, A.E. et al., "Enhancement of the Sagnac Effect Due to Nonlinearly Induced Nonreciprocity," Optics Letters, vol. 6, No. 12, pp. 590-592 (Dec. 1, 1981).
Kaplan, A.E. et al., "Directionally Asymmetrical Bistability in a Symmetrically Pumped Nonlinear Ring Interferometer," Optics Communications, vol. 40, No. 3, pp. 229-232 (Jan. 1, 1982).
Wang, Chao et al., "A Nonlinear Microresonator Refractive Index Sensor," J. of Lightwave Tech., vol. 33, No. 20, pp. 4360-4366 (Oct. 15, 2015).

* cited by examiner

NONRECIPROCAL LIGHT PROPAGATION SYSTEMS AND METHODS

The present invention relates to optical resonator systems and methods and more particularly to systems and methods with symmetry breaking of counter-propagating light waves in nonlinear optical resonators.

The paper: A. E. Kaplan, P. Meystre, Enhancement of the Sagnac effect due to nonlinearly induced nonreciprocity. *Optics Letters.* 6, 590-2 (1981), discloses a nonlinear ring interferometer in which nonlinearly induced nonreciprocity of counterpropagating waves are caused by the formation of an index grating in the nonlinear medium.

US 2003/0123780 A1 discloses the implementation of the Kerr effect in an integrated ring resonator in which waves propagate in opposite directions. Light travelling in one direction modulates the power in the other direction. The powers used are not high enough to produce symmetry breaking and there is no differential resonance shift.

A number of prior art documents disclose optical loop arrangements which are not resonators, for example WO 00/54080A, WO 2010/025258A1, JP H08334800A, U.S. Pat. No. 5,677,767A, and EP 3046191A1.

Aspects of the present invention seek to provide an efficient way of controlling light with light.

According to a first aspect of the present invention there is provided a resonator system comprising an optical loop resonator made of material with a non-reciprocal optical non-linearity such that the presence of counterpropagating light induces a stronger resonance frequency change than copropagating light of the same intensity, means for introducing first and second optical waves from at least one light source in opposite directions into the resonator at total intensities such as to produce a non-linear interaction between the first and second counterpropagating waves whereby to establish different resonant frequencies for the two different directions of light propagation.

The optical waves are produced by one or more lasers.

Preferably the first and second counterpropagating waves have respective resonance frequencies, the difference between the resonance frequencies being different from the difference, if any, between the frequencies of the first and second optical waves.

In embodiments of the invention, symmetry breaking corresponds to a resonance frequency splitting that allows only one of two counter-propagating (but otherwise identical) light waves to circulate in the resonator. Equivalently, the symmetry breaking can be seen as the collapse of standing waves and transition to travelling waves within the resonator. The resulting effects have the advantage of permitting a wide range of practical applications.

The non-linear interaction is preferably produced by the Kerr effect. Alternatively, it can be produced by another non-linear effect such as Brillouin scattering or Raman scattering, which would permit use of either ring or linear resonators. Alternatively the nonlinear effect could be produced by other optical nonlinearities that break the symmetry between counterpropagating light waves.

Preferably the resonator comprises a ring resonator and the waves are coupled into the resonator in clockwise and counterclockwise directions. The term "ring" does not imply that the resonator needs to be circular. An advantage of preferred embodiments of the present invention is that the resonator is monolithic and no mirrors are required.

The system preferably comprises a first arm for introducing the clockwise-propagating wave into the resonator and a second arm for introducing the counterclockwise-propagating wave into the resonator. The arms may be fed by a common laser source. This has the advantage of providing a compact, controllable device.

Alternatively, the arms may be fed by different light sources operating at the same or different frequencies that are resonant in the resonator.

With a common source, one of the arms preferably includes attenuating and/or modulating means, e.g. a Mach-Zehnder modulator. This allows modulation of the ratio of the light powers i.e. intensities, and/or the frequencies fed to the respective arms.

Each arm preferably comprises a respective light-separating means connected to a respective measurement means. The light-separating means separate the light coming from the resonator and enable the measurement of the clockwise and/or counterclockwise resonator powers of the resonator, e.g. using photodiodes. Alternatively, or in the addition the clockwise and counterclockwise frequencies or phases might be measured.

According to a second aspect of the present invention there is provided a method of producing different optical effects in opposite directions in an optical loop resonator made of material with a non-reciprocal optical non-linearity comprising introducing first and second optical waves into the resonator from at least one light source in opposite directions at total intensities such as to produce a non-linear interaction between the first and second waves whereby to establish different resonant frequencies between the first and second counterpropagating waves.

According to a third aspect of the present invention there is provided a method of adjusting the relative power between waves counterpropagating in a static optical resonator comprising coupling substantially identical waves into the resonator in opposite directions and with such a total intensity that a non-linear interaction occurs between the waves, wherein the resonator is subjected to an external effect which has a differing effect on the two waves and the difference is detected.

The non-linear interaction preferably involves the Kerr effect.

Preferably, the resonator is a ring resonator and the waves are coupled into the resonator in clockwise and counter-clockwise directions.

The waves may be coupled into the resonator with different powers and/or frequencies and/or poliarization and/or coupling positions. This enables devices to be produced which act as optical flip-flops, binary memory units, power comparators, switchable circulators or isolators.

Alternatively, substantially identical waves may be coupled into the resonator and the resonator is subjected to an external effect which has a differing effect on the two waves and the difference is detected. The detected difference may be measured. This enables devices to be produced which serve as rotation sensors, proximity sensors, particle sensors or refractive index sensors.

The resonating system may be employed as a Sagnac effect sensor. The resonator may be rotatable relative to the other components of the system or substantially the whole system may be configured to rotate.

According to a fourth aspect of the present invention there is provided a method of adjusting the relative power between waves counterpropagating in an optical resonator which have such a total intensity that a non-linear interaction occurs between the waves, comprising the step of generating at least one of the counterpropagating waves within the resonator itself by means of a nonlinear optical effect or optical gain.

Embodiments of the present invention provide a method of operating an optical resonator having a cavity linewidth and comprising introducing first and second optical waves into the resonator in opposite directions at total intensities such as to produce a non-linear interaction between the waves and tuning the waves into a resonance that separates the resonance frequency in one direction by more than the cavity linewidth from the resonance frequency in the other direction.

The waves may be in the infrared, visible or ultra violet regions provided the optical resonator material is transparent at the required wavelength. The term "light" should be construed accordingly.

Preferred embodiments of the present invention will now be described, by way of example only, with reference to the accompanying drawings, of which:

FIG. 15b is a frequency diagram relating to FIG. 15a; and

Figure 1:
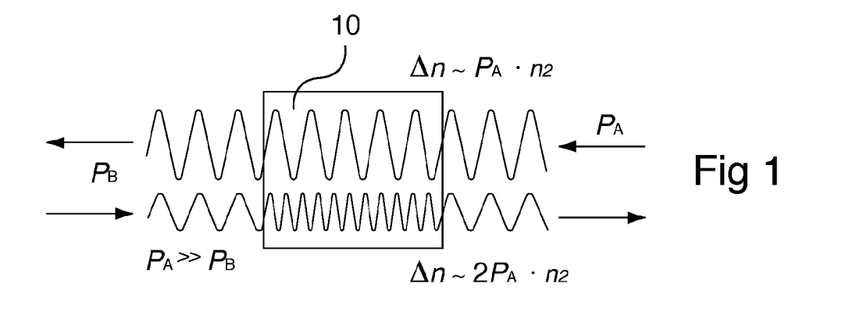
FIG. 1 shows the interaction between counter propagating light beams in a nonlinear Kerr medium.

The nonlinear interaction between counterpropagating light waves with powers $P_A$ and $P_B$ in a nonlinear Kerr medium 10 is illustrated in FIG. 1 which shows the principle of Kerr nonlinearity mediated interaction between counter-propagating light without a resonator. Two counter propagating but spatially overlapping light waves with identical frequency will experience a different effective refractive index change $\Delta n$ depending on their powers ($P_A$, $P_B$). The light wave with lower optical power ($P_B$) experiences a stronger refractive index increase, which leads to a shorter wavelength. Thus two counterpropagating light waves with equal wavelength outside of a nonlinear Kerr medium have different wavelengths within the medium in the case of a power imbalance of the two light waves. This can be explained by cross-phase modulation between the two light waves, in which the weaker light wave experiences a stronger refractive index change. More specifically, the refractive index change $\Delta n$ induced by the nonlinear interaction is given by $$\Delta n_A = \frac{n_2}{A_{eff}}(P_A + 2P_B) \text{ and } \Delta n_B = \frac{n_2}{A_{eff}}(P_B + 2P_A), \quad (1)$$

with subscripts A,B indicating the two counterpropagating waves with power $P_{A,B}$, $n_2$ being the nonlinear refractive index of the medium and $A_{eff}$ being the effective mode cross-section. It is important to note that the presence of a counter propagating light wave induces a two times stronger refractive index change compared to the self-phase-modulation induced refractive index change. Thus in view of the powers employed there is an effective doubling of the Kerr effect in the case of counter-propagating waves as contrasted with the normal Kerr effect employed in US 2003/0123780 A1.

Figures 3, 4:
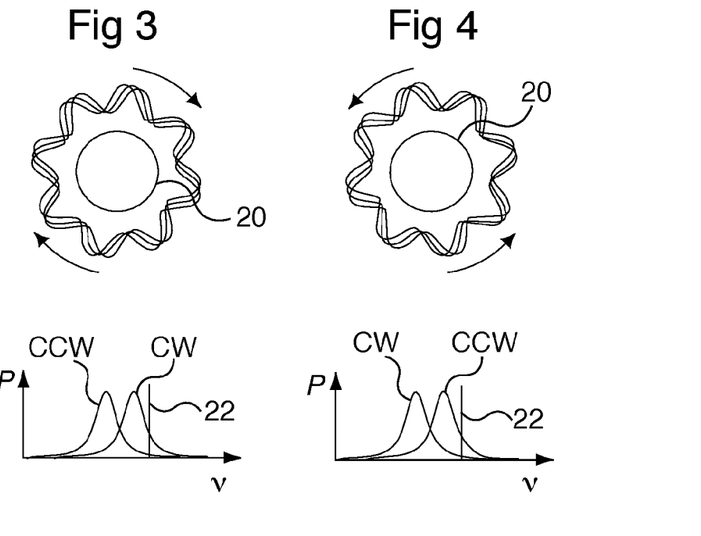
FIGS. 3 and 4 show bi-directional pumping at higher powers.

In the case of an optical resonator with $\chi^{(3)}$ nonlinearity, the difference in refractive index change leads to two different optical path lengths experienced by the counter propagating modes. This is reflected in a splitting of the resonance frequencies of the clockwise (CW) and counterclockwise (CCW) modes as shown in FIGS. 3 and 4. Such a resonator 20 exhibits symmetry breaking when simultaneously pumped with equal power in both the CW and CCW directions. This may be explained as follows. For the resonator to be stably thermally locked to the pump light, which is assumed to have the same frequency for both directions, the light must be blue-detuned from the center of the resonance. Under this condition, if more power happens to be coupled in the CW direction, the CCW resonance is shifted down in frequency (away from the pump) by more than the CW resonance, further increasing the difference between the coupled powers and leading to a self-amplification of the mode splitting.

Resonators in embodiments of the present invention preferably have a $\chi^{(3)}$ nonlinearity with a nonlinear refractive index $$n_2 > 0.8 \times 10^{-20} \text{ m}^2/\text{W}$$

Figure 2:
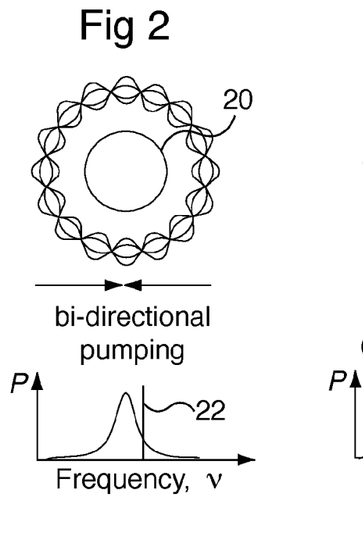
FIG. 2 shows bi-directional pumping at low power.

FIG. 2 shows bi-directional pumping of a whispering gallery resonator 20 at low power, generating a standing wave. For low and equal pump powers (as shown in FIG. 2), no splitting is induced and the CW and CCW circulating powers remain equal. Above a certain threshold pump power however, the state with equal coupled powers becomes unstable, and the system instead collapses into one of the two states shown in FIGS. 3 and 4, breaking the CW-CCW symmetry. The line 22 in FIGS. 2 to 4 indicates the frequency of the pump laser.

Figure 5:
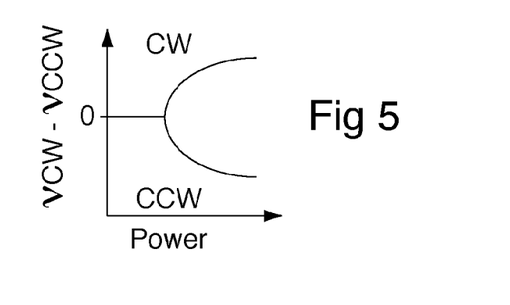
FIG. 5 shows the resonance frequency splitting with increasing power.

FIG. 5 illustrates the resonance frequency splitting with increasing power. The frequencies are the same for both directions for small circulating powers. Above the threshold power the symmetry breaks, resulting in a different frequency shifts for the two directions and one coupling into the resonator more than the other. The resonant frequency splitting is to be distinguished from the resonance frequency shifting disclosed in US 2003/0123780 A1.

In quantitative terms, the optical powers that are coupled into the clockwise and counterclockwise circulating modes of a whispering gallery resonator are given by the following coupled equations:

$$P_{CW} = \frac{\eta P_{in,CW}}{1 + \left(\frac{\delta}{\gamma} + \frac{1}{P_0}(P_{CW} + 2P_{CCW})\right)^2} \quad (2)$$

$$P_{CCW} = \frac{\eta P_{in,CCW}}{1 + \left(\frac{\delta}{\gamma} + \frac{1}{P_0}(P_{CCW} + 2P_{CW})\right)^2} \quad (3)$$

Here, $P_{in,CW}$ and $P_{in,CCW}$ are the incident pump powers, $\delta$ is the detuning of the laser frequency with respect to the resonance frequency without Kerr shift, $\gamma$ is the loaded half-linewidth of the resonance, equal to the sum $\gamma_0+\kappa$ of the intrinsic and coupling induced half-linewidths, and $\eta=4\kappa\gamma_0/\gamma^2$ is the coupling efficiency. The quantity $P_0=\pi n_0 A_{eff}/(QF_0n_2)$ is the coupled power at which nonlinear effects occur. Here, $n_0$ and $n_2$ are the resonator's linear and nonlinear refractive indices, $A_{eff}$ is the mode's effective cross-sectional area, Q is the loaded quality factor, and $F_0$ is the intrinsic finesse. Importantly, equations (2,3) show that the nonlinear interaction with the counter-propagating light wave is twice as strong as the self-phase modulation induced interaction. This can be seen in the factor of two in the term $P_{CW}+2P_{CCW}$ in equation (2). Moreover, an analysis of equations (2,3) show that for $P_{in,CW}=P_{in,CCW}$, symmetry breaking occurs when $\eta P_{in,CW}/P_0 > 8/(3\sqrt{3}) \approx 1.54$ over a range of $\delta/\gamma$ that depends on the value of $\eta P_{in,CW}/P_0$, and that at the threshold pump power, this range is limited to the single point $-5/\sqrt{3} \approx -289$.

Figure 6:
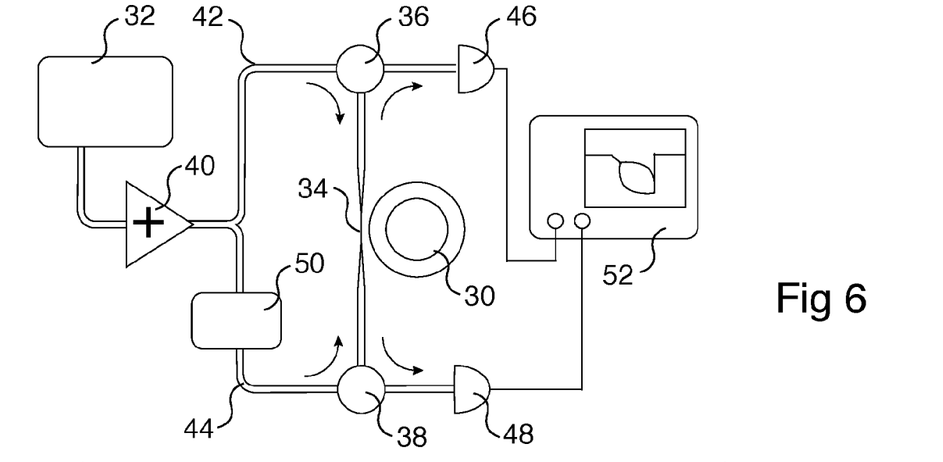
FIG. 6 shows an embodiment of a resonator system in accordance with the present invention.

An embodiment of the present invention is shown in FIG. 6, which is based on a 2.7 mm diameter high-Q whispering-gallery-mode fused silica microrod resonator 30. The resonator has a quality factor $Q_0$ of approximately $7 \times 10^7$ and an effective modal cross-sectional area $A_{eff}$ of approximately 60 $\mu m^2$. Light from an amplified continuous wave external cavity diode laser 32 in the 1.55 µm wavelength range is coupled into the resonator in both directions via an erbium doped fibre amplifier 40, loop arms 42, 44, and a tapered optical fiber 34. The light is resonant or nearly resonant with one of the cavity modes of the resonator 30. Two optical circulators 36, 38 separate the light coming from the microresonator and enable the measurement of the microresonator's clockwise and counterclockwise resonance frequencies using two photodiodes 46 and 48. The outputs of photodiodes 46 and 48 can be displayed and compared on an oscilloscope 52. The relative power between the counterpropagating pump light can be adjusted using an amplitude modulator 50. A fiber-coupled Mach-Zehnder electro-optic modulator allows modulation of the ratio of the pump powers $P_{in,CW}$ and $P_{in,CCW}$.

Preferred quality factors lie above $10^6$ and preferably lie within the range $10^6$ to $10^9$. Preferred effective modal cross-sectional areas $A_{eff}$ lie below 100 $\mu m^2$ and preferably lie within the range 40 to 100 $\mu m^2$.

Systems according to the present invention operate within the range 1 microwatt to 10 watts, preferably within the range 1 mW to 100 mW.

Figure 7:
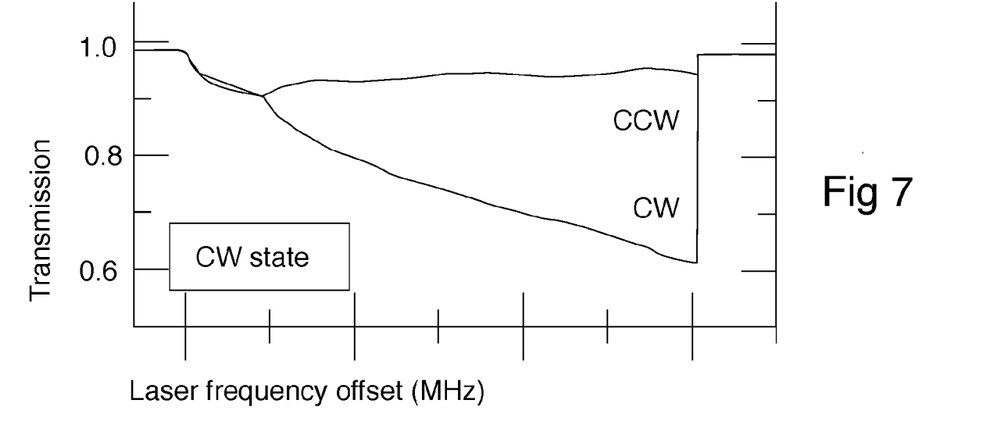
FIGS. 7 and 8 show two possible conditions of the resonator system.
Figure 8:
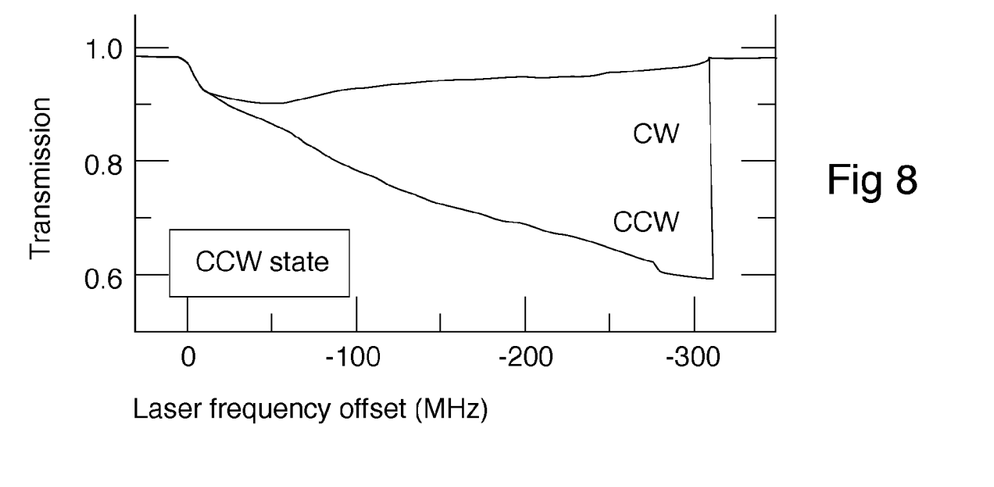

The spontaneous symmetry breaking is illustrated in FIGS. 7 and 8 which show transmission through the tapered fibre 34 vs. laser frequency taken on two consecutive sweeps with exactly the same experimental configuration, with $P_{iCW}=P_{iCCW}$ and $\eta P_{iCW}/P_0 \approx 4$. Despite the equal pump powers in the two directions, the system spontaneously "picks" one of two possible configurations. The vertical axis is normalized to the transmission of the taper when it is far from the resonator.

Figure 9:
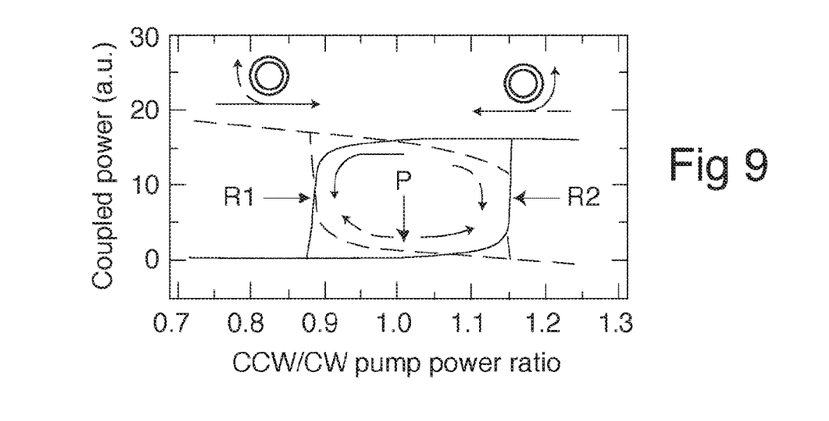
FIG. 9 shows a hysteresis effect obtainable with the resonator system.

A feature of the bistable regime is hysteresis, which is shown in FIG. 9. The clockwise wave CW is represented by the broken line and the counterclockwise wave CCW by the solid line. The insets indicate the power flow in the two states. Holding the laser frequency constant within the bistable regime, $P_{in,CCW}$ is modulated at 5 kHz by ±25%. The observed hysteresis can be explained by the resonance frequency splitting between the two stable states. To overcome the resonance splitting and switch into the other state, the initially weaker pump direction has to be significantly increased to a level well above the power of the counter-propagating light. The presence of this hysteresis is important as it allows the system to be used as an all-optical flip-flop or binary memory unit. Moreover, the non-reciprocal light propagation in each of the stable states could be used to realise a switchable optical circulator or isolator.

Figure 10A:
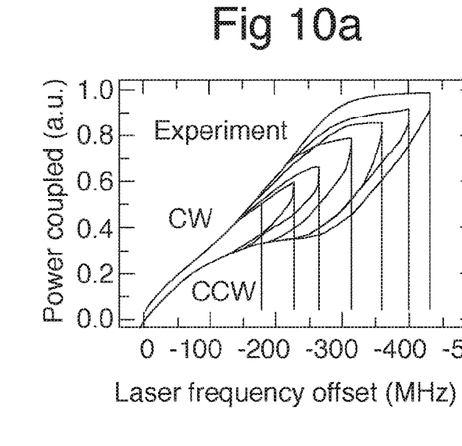
FIGS. 10a and 10b show the practical and theoretical results for the amplification of power imbalances for a series of different values of total incident power.
Figure 10B:
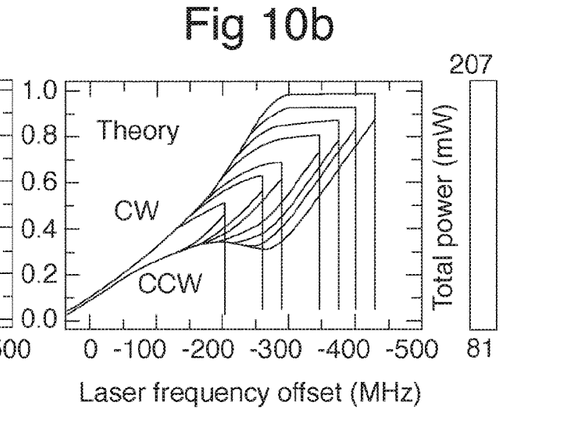

Practical and theoretical results for the amplification of power imbalances are shown in FIGS. 10a and 10b. FIG. 10a shows the amount of light coupled into the resonator as a function of the laser frequency for increasing incident powers. Higher powers lead to an increased splitting of the clockwise and counterclockwise modes. The incident power is 10% higher in the clockwise direction to avoid switching caused by fluctuations in the relative power. Here the laser frequency is scanned across the resonance for a range of total pump powers $P_{in,T}=P_{in,CW}+P_{in,CCW}$, while keeping the ratio $P_{in,CCW}/P_{in,CW}$ fixed at 0.9. For $P_{in,T}$ below the nonlinear threshold the two counterpropagating modes show identical increase in power when sweeping across the resonance (lowest power curve in FIG. 10a). Increasing the power further, the effect of the cross-phase modulation induced Kerr shift leads to a strong difference of more than 60% between the coupled powers despite the fact that the pump power difference is only 10%. The theoretical results shown in FIG. 10b use the same parameters as employed practically in FIG. 10a. A thermal shift in the frequency, proportional to the sum of the coupled powers and about 70 times as strong as the Kerr shift, was also included in the calculations.

Figure 11:
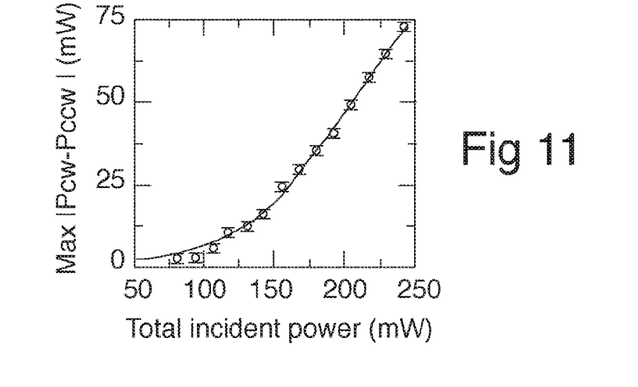
FIG. 11 shows the corresponding curve of maximum coupled power difference against the total incident power.

A fit of the maximum coupled power difference vs. total pump power $P_{in,T}$, as shown in FIG. 11 is in excellent agreement with the measured power splitting. FIG. 11 shows the maximum difference between clockwise and counterclockwise coupled power as a function of the total input power. The dots show the experimental measurements while the curve is a theoretical fit for a pump power ratio of 0.9. Small deviations between the curves in FIGS. 10a and 10b may be attributed to modelling the system using the assumption that the thermal shift of the resonance frequency is immediate, whereas in reality it occurs over a range of timescales. Further errors may originate from the measurement of the Q-factor or the mode cross-sectional area.

Figure 12A:
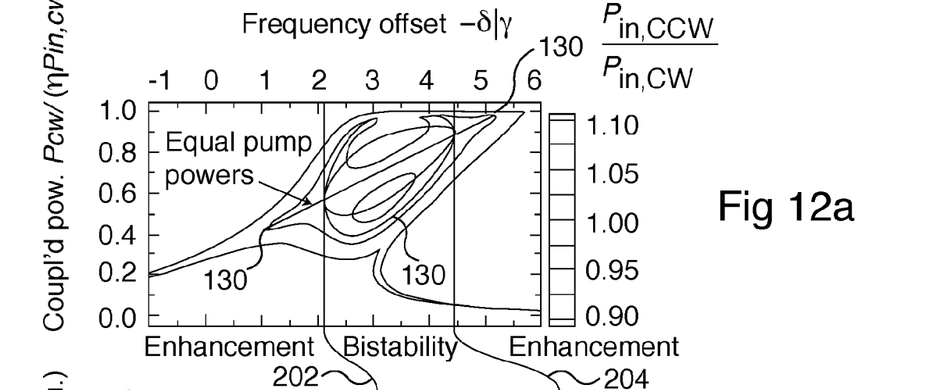
FIGS. 12a and 12b show the theoretical and practical curves of coupled power against laser frequency offset.
Figure 12B:
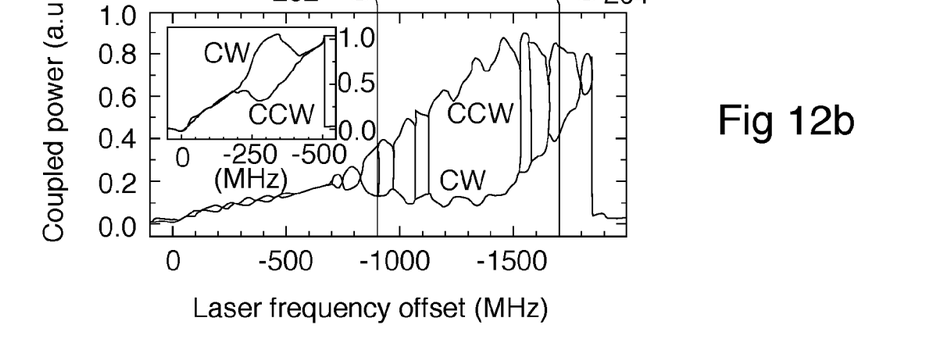

The above effects are summarized by the theoretical plot in FIG. 12a. FIG. 12a shows the theoretical prediction for the power $P_{CW}$ coupled into the resonator in the clockwise direction as a function of the normalized laser detuning frequency $\delta/\gamma$. The incident power imbalance is represented by the top left shading corresponding to higher power in the CW direction, and the bottom right shading corresponding to higher power in the CCW direction. The middle line 130 extending from bottom left to top right shows symmetry breaking for equal pump powers (in the bistable region between the two lines 202, 204). In this region two stable solutions exist for a range of power imbalances. The central lighter-shaded area within the lines 202, 204 contains unstable solutions. The plot is shown for $\eta P_{in,CW}/P_0=1.8$, slightly above the threshold for nonlinear mode splitting of 1.54. Outside the region of bistability demarcated by the lines 202, 204, any pump power imbalance is amplified in the difference between the coupled powers. As the lines 202, 204 are approached, the gain factor diverges, rendering the system extremely sensitive to the precise pump powers and detunings as well as the losses in the resonator. This makes it well suited for applications in enhanced sensing, e.g. of refractive index or differential power. Notably, splittings in the resonance frequency due to the Sagnac effect are also amplified, enabling an optical gyroscope to be built. These different regimes are demonstrated by the practical data in FIG. 12b, in which the pump power ratio is modulated about unity by ±3% during the frequency sweep. The laser frequency is scanned across the resonance while backscattering-induced interference effects in the setup cause $P_{in,CCW}/P_{in,CW}$ to change about unity by ±3% with a period of ~170 MHz in the laser frequency. Outside the lines 202, 204 the coupled power difference is enhanced with respect to the incident power imbalance by the nonreciprocal Kerr shift. The enhancement increases approaching the bistable regime, in which the system begins to jump between the two stable configurations. The inset shows a sweep across a microresonator mode with equal power, leading to a "bubble"-shaped symmetry breaking corresponding to the line 130 in FIG. 12a. In the first region the coupled powers exhibit an enhancement of the oscillation that becomes stronger and stronger approaching the line 202. To the right of this line, the system responds to the oscillation by switching between the two stable solutions, crossing the unstable region instantaneously. In the region of maximum splitting between the CW and CCW mode, the power modulation is not sufficient to induce a switching between the states. This enables stable operation in either the CW or CCW state independent of optical power fluctuations. In the case of bidirectional pumping with equal powers the splitting shown in the inset of FIG. 12b is observed, which is in good agreement with theoretical calculations (line 130 in FIG. 12a).

Various modifications can be made to the practical arrangements disclosed above. In addition to whispering-gallery-mode oscillators other nonlinear optical resonators can be employed providing they support counter propagating optical modes. For example the resonator may comprise one or more of a fibre-loop, a waveguide loop, a fibre cavity and/or a free-space cavity with nonlinear element. A particularly useful example is a chip-integrated photonic waveguide loop.

Instead of having a single common laser source 32, two laser sources may be employed, one for each counter-propagating wave.

Where a single laser source 32 is employed, the laser light may be split by one or more of an optical beam splitter, a fibre-based coupler, a waveguide coupler, a polarizing beam splitter, a birefringent material, a partially reflective mirror, a spatial light modulator, one or more gratings, and/or one or more wavelength-dependent multiplexers.

Instead of a tapered fibre 34, light can be coupled into and out of the resonator at one or more locations by one or more of a waveguide, a prism, free-space, an angle-cleaved fibre, a cleaved fibre, partially reflective mirrors, or by evanescent coupling techniques.

Instead of coupling light into the resonator, one or more of the light waves in the resonator can be generated by nonlinear optical effects or optical gain in the resonator itself. The nonlinear optical effects can be one or more of Raman scattering, Brillouin scattering, parametric down conversion, four-wave mixing, second harmonic generation, third harmonic generation, optical frequency comb generation, sum frequency generation, or difference frequency generation. Optical gain could be generated by doping the resonator material and pumping at a suitable wavelength. Instead of the Mach-Zehnder device 50, frequency differences between the counter-propagating light waves can be produced by another type of electro-optic modulator, an acoustic-optic modulator or by frequency or phase locking of one laser to another.

Losses or gains in the resonator can be effected by modifying its Q factor. It is possible to increase the losses of the resonator by placing an object in close proximity to it, of the order of 1 µm, to disturb the evanescent electric field of the resonant mode. One may also compensate losses with gain, e.g. by doping the resonator with atoms that emit light at the wavelength being used, such as erbium for 1550 nm, and pumping them.

Instead of circulators 36, 38 the light waves entering and exiting the resonator may be separated by other means, for example one or more of fibre couplers, waveguide couplers, dichroic mirrors, or by beam splitters, e.g. polarization beam splitters.

Figure 13:
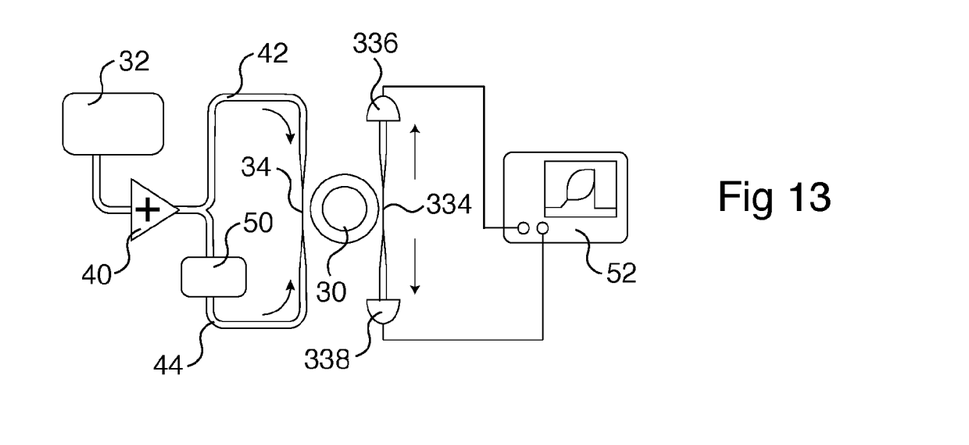
FIG. 13 shows a resonator system in accordance with a second embodiment of the present invention.

FIG. 13 shows another embodiment in accordance with the invention which avoids the use of circulating means. A different tapered fibre 334 from fibre 34 is used to detect signals proportional to the light coupled into the resonator in each direction. The signals are measured by photodiodes 336 and 338.

Figure 14:
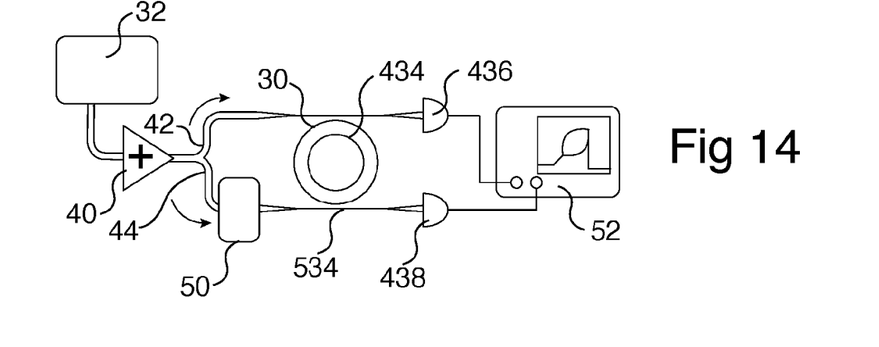
FIG. 14 shows a resonator system in accordance with a third embodiment of the present invention.

FIG. 14 shows a further embodiment in accordance with the invention which also avoids the need for circulating means. A first tapered fibre 434 couples in clockwise waves; it also couples out clockwise waves to a first photodiode 436. A second tapered fibre 534 couples in counterclockwise waves; it also couples out counterclockwise waves to a second photodiode 438.

In all the embodiments of FIGS. 6, 13 and 14, additional tapered fibres (or other coupling means) may be provided at further locations around the resonator 30 for coupling in and/or coupling out waves.

One or more of the following properties of the light waves that leave the resonator (having interacted therewith) may be detected: power, phase, absolute frequency, frequency difference between counterpropagating light waves, polarisation, relative phase and/or relative power e.g. using a balanced photodiode.

The material of resonator 30 may comprise on or more of fused silica, silicon nitride, calcium fluoride, magnesium fluoride, silicon, crystalline silica, germanium oxide, barium oxide, water, aluminum gallium arsenide, diamond, sapphire, chalcogenide glasses, doped glasses, lithium niobate, zinc selenide, gallium selenide, zblan, fluorotellurite glasses and/or aluminum nitride, or other nonlinear optical materials.

The following are practical applications of embodiments of the present invention:

A) An optical diode. An optical diode or isolator is a two port device that allows the light to flow just in one direction. One such arrangement in shown in FIG. 15a which is useful in preventing signals reflected back from an output device from reaching the laser emitting the signals. A laser signal arriving at port 3 is coupled into the resonator 30 by a tapered fibre coupler 734. This establishes a CCW resonance state in the resonator and an output signal is provided to an output device (not shown) such as a photodiode detector at port 1. In practice, a fraction of the signals is reflected back at port 1. In view of the nonreciprocal condition prevailing in the resonator 30 any reflected wave tending to be coupled back into the resonator is not at a resonant frequency in the CW direction and destructively interferes with itself. Thus waves reflected back from port 1 mostly pass to port 2 and, more importantly for the operation of the diode, waves passing through the resonator 30 are significantly suppressed, so that substantially no waves pass back to the laser at port 3. It should be noted that even if the wave reflected at port 1 is relatively weak, the resonator still exhibits its nonreciprocal nonlinear behavior because it is the total power of the clockwise and counterclockwise waves which is significant. This factor applies to all embodiments of the invention.

Figure 15A:
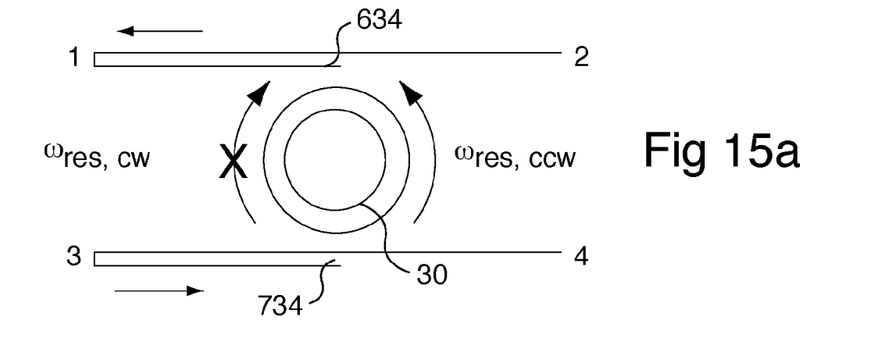
FIG. 15a shows a resonator system in accordance with a fourth embodiment of the present invention.
Figure 15B:
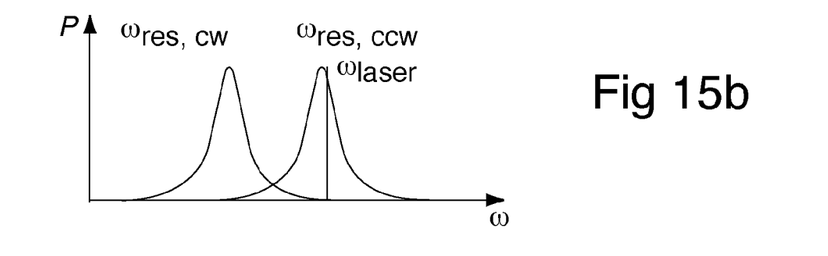

FIG. 15*b* indicates the resonance frequencies of the clockwise wave and the counterclockwise wave, and the laser frequency of the system shown in FIG. 15*a*.

The optical diode arrangement of FIG. 15 can be used to advantageously replace conventional optical diodes or isolators employing Faraday rotators. A particular advantage is that it can be integrated onto a microchip together with other components of the resonator system.

Figure 16:
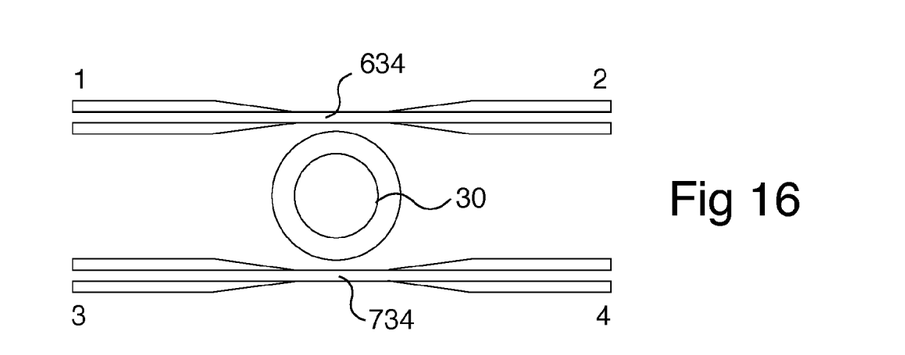
FIG. 16 is a diagram useful in explaining various practical applications of embodiments of the present invention.

FIG. 16 shows a general configuration of an optical diode or isolator with two tapered fibres 634, 734. Ports 1 and 2 are used as inputs/outputs for the signal light. If a control light, either with the same or different frequency as the signal and with power higher than the signals, is injected into port 3, the device is set in a CCW state. In this state, signal light can pass from 1 to 2 but not from 2 to 1. Injecting a control light into port 4 instead allows the signal to pass from port 2 to 1 but not vice versa.

The same behavior can be obtained using ports 1 and 3 for the signals and ports 2 and 4 for the control light. Similar behavior can be obtained by using only two ports, for example 1 and 2. Sending control light into port 1 sets the system into the CW state in which light can pass from port 2 to 1 but not from 1 to 2.

If desired, additional ports can be used to select the direction.

Thus, this arrangement provides an all-optical switch or switchable optical diode.

B) An optical circulator. An optical circulator is a three port device that routes the light injected in the input to the common port and any light injected in the common port to the output port. Referring to FIG. 16 again, a control light, either with the same or different frequency as the signal and with power higher than the signals, is injected into port 3. In this configuration with the resonator in CCW state, light passes from port 1 to 2, from port 2 to 4, from 4 to 3 and from 3 to 1. An alternative setup is possible in which light is sent into the system from port 1 during operation and higher than any other signal. In this case 1 is the input port, 3 is the common port, 4 is the output port and 2 is not used.

C) An optical flip-flop. This employs the hysteresis effect shown in FIG. 9. The system is operated in the region of point P of the one of the CW or CCW curves. If the power in the other direction increases, the point of operation moves towards one of the substantially vertical regions R1, R2 of the curves in FIG. 9 and the propagation can change to the other direction.

Referring again to FIG. 16, 1 is the set input, 3 is the reset input, 4 is the Q output, and 2 is the NOT-Q output. The device needs nearly equal power on both the input ports to work and the signals can be transmitted as power increases on the corresponding input port or as power reduces on the opposite input port.

The pump light necessary to keep the device active and the signals light may have different frequencies.

The optical flip-flop can store a state line 1 and 0 (in this case CW and CCW) for an indefinite amount of time while it stays powered. It is possible to program this state on the device using only light beams, and to read it out if desired with photodiodes.

D) An optical power comparator. The device can be used to amplify optical power differences up to infinite gain where it behaves as a comparator, revealing which beam has higher power with an extraordinary sensitivity and accuracy greater than differential photodiodes. Here the system is operated in the region of the one of lines 202, 204 in FIG. 12, i.e. at the edge of the enhancement region where there is no, or substantially no, hysteresis. If the system is oscillated about the line 202 or 204 it is ensured that, at one point, operation is actually on the line.

E) A proximity sensor in the optical near field. The system of FIG. 6 is suitable for use in sensors. The light is trapped in surface modes of the resonator so there is a part of the electromagnetic field lying outside the resonator really close to the surface (length of the order of the wavelength, i.e. a few μm). Placing an object close to the resonator alters the electromagnetic field and this can be detected due to the nonlinear enhancement. If one can determine the location of an object relative to the peaks and troughs shown in FIG. 2, one can detect how close it is by the strength of the splitting.

F) A refractive index sensor. The device can be used to sense changes in refractive index of a material placed close to the microresonator in a similar way to application E).

G) A single particle sensor. Similarly to applications E) and F), any particle in contact with the resonator modifies its characteristics and can therefore be detected.

H) An all-optical oscillator. Competition between the counter-propagating waves leads to an oscillator that produces pulsating light fed by continuous-wave light.

I) A power limiter. A fraction of the incoming light is coupled in the opposite direction; when a certain power level is reached, saturation occurs. At least one more arm may be added to the system to measure the effective power on that arm, and using a feedback arrangement to stabilize that power.

J) An enhanced rotation sensor. The Sagnac effect creates a shift of the resonance frequency for light travelling in opposite directions in a rotating setup proportional to the speed and the area enclosed by the optical path. The nonlinearity in the resonator enhances the shift induced by the Sagnac effect. Furthermore the high Q-factor makes the light travel thousands of turns inside the resonator increasing the effective path length and associated area. Splittings in the resonance frequency due to the Sagnac effect are amplified, enabling a form of optical gyroscope to be built. In contrast to the system disclosed in the above-mentioned Kaplan paper, only the resonator 30 and its adjacent couplings need to rotate; the remainder of the system can remain static. The counter-propagation of the waves occurs exclusively within the resonator 30, so that it is the resonator itself which senses the rotation. Unlike in Kaplan's arrangement, the resonator is a waveguide ring resonator or whispering gallery resonator and does not consist of four mirrors forming an optical cavity (with a gas or vacuum as medium).

K) Logic elements. Using FIG. 16, an example for an "or"-gate would be that the input from port 1 or port 4 could bring the resonator above threshold for switching between CW and CCW state. Similarly, for an "and"-gate, the system can be operated such that just the combined power in port 1 and port 4 makes the system switch. Other logic element arrangements can also be provided.

An advantage of all the various practical applications of embodiments of the invention is that they can be integrated on a photonic chip.

The features of the various embodiments and modifications described, and of the claims, may be substituted for each other or combined as desired.

The invention claimed is:

1. An optical signal handling system comprising an optical loop resonator made of material with a non-reciprocal optical non-linearity such that the presence of counterpropagating light induces a stronger resonance frequency change than copropagating light of the same intensity, at least one light source coupled to a first arm for introducing a first optical wave into the resonator and to a second arm for introducing into the resonator a counterpropagating second optical wave having the same frequency as the first wave, said first and second waves having total intensities such as to produce a non-linear interaction between the first and second waves, wherein one of the arms comprises an attenuator or an amplifier whereby to establish different resonant frequencies for the two different directions of light propagation.

2. An optical signal handling system according to claim 1, employing the Kerr effect.

3. An optical signal handling system according to claim 1, wherein the at least one light source is a common light source.

4. An optical signal handling system according to claim 3, comprising one or more further means for introducing the first wave into the resonator and/or one or more further means for introducing the second wave into the resonator.

5. An optical signal handling system according to claim 1, wherein each arm comprises a light separator connected to a respective measurement means.

6. An optical signal handling system according to claim 1, wherein the resonator has a cavity linewidth and wherein the resonant frequencies differ by at least the cavity linewidth.

7. An optical signal handling system according to claim 1, all the components of which are static.

8. An optical signal handling system according to claim 1, wherein at least one of the waves is generated within the resonator itself by means of a nonlinear optical effect or optical gain.

9. An optical signal handling system according to claim 1 used to provide an optical diode or isolator, an optical circulator, an optical flip-flop, an optical power comparator, a proximity sensor, a refractive index sensor, a particle sensor, an oscillator, or a power limiter comprising a resonator system.

10. An optical signal handling system according to claim 1, wherein the resonator is rotatable relative to other components of the system.

11. A Sagnac effect sensor comprising a system according to claim 10.

12. A method of producing different optical effects in opposite directions in an optical loop resonator made of material with a non-reciprocal optical non-linearity such that the presence of counterpropagating light induces a stronger resonance frequency change than copropagating light of the same intensity, comprising introducing first and second optical waves via first and second respective arms into the resonator from at least one light source in opposite directions and with the same frequency and at total intensities such as to produce a non-linear interaction between the first and second waves whereby to establish different resonant frequencies for the two different directions of light propagation.

13. A method according to claim 12 for connecting a light source to an output device without reflections wherein the light source introduces light from a first port which is coupled via a first coupler in a direct direction within the resonator, light emerging from the resonator via a second coupler to the output device, and wherein the light reflected from the output device passing back to the second coupler is not coupled back to the resonator.

14. A method of adjusting the relative power between waves counterpropagating in a static optical resonator made of material with a non-reciprocal optical non-linearity and comprising first and second arms, the method comprising coupling identical waves into said first and second arms of the resonator in opposite directions and with such a total intensity that a non-linear interaction occurs between the waves, wherein the resonator is subjected to an external effect which has a differing effect on the two waves and the difference is detected.

15. A method according to claim 14, wherein the frequency of one or each wave is tuned to alter the differing effect.

* * * * *